June 27, 1967  E. J. NICHOLL  3,327,974
AIRCRAFT WITH LOAD COMPENSATING LANDING GEAR
Filed Jan. 17, 1966  2 Sheets-Sheet 1

INVENTOR
EDWARD J. NICHOLL
BY
Orland M. Christensen
ATTORNEY

United States Patent Office 3,327,974
Patented June 27, 1967

3,327,974
AIRCRAFT WITH LOAD COMPENSATING
LANDING GEAR
Edward J. Nicholl, Charlton Kings, Cheltenham, England,
assignor to Dowty Rotol Limited
Filed Jan. 17, 1966, Ser. No. 520,941
7 Claims. (Cl. 244—100)

This invention relates to aircraft having main landing gear components disposed on opposite sides of the longitudinal axis of the aircraft.

The designs of some present day aircraft require that the main landing gear components are mounted in the aircraft fuselage, or sometimes in nacelles at the sides of the fuselage. To mention one example, in an aircraft with variable sweep-back wings it is desirable for ease of installation to provide a narrow track main landing gear the components of which are mounted in the fuselage.

The provision of a narrow track main landing gear does, however, introduce the problem of maintaining stability of the aircraft when running along the ground and subjected to lateral disturbing forces. The problem of ensuring stability is most acute when the speed of the aircraft is insufficient for control by the aerodynamic surfaces to be effective.

If the aircraft is running on a straight course with even lateral trim, the weight vector acting vertically through the centre of gravity of the aircraft will intersect the ground centrally between the opposite wheels. If the aircraft is running on a straight course with one wing dipped, for example on account of a cross-wind, the weight vector intersects the ground nearer to the wheels on the dipped side than on the other. The landing gear component on one side is therefore subjected to increased loading while the component on the other side is partially relieved of load, and as it is usual to provide shock-absorbing components, the resulting compression of one and extension of the other will increase the dip of the lower wing still further.

The same problem is encountered when the aircraft is steered on a curved course because the resultant of aircraft weight and centrifugal force acting through the centre of gravity of the aircraft will intersect the ground in an inclined direction nearer to the wheels on one side than on the other. If the height of the centre of gravity is large compared with the track of the landing gear, it is possible for the resultant load to intersect the ground outside the track of the wheels with the result that all lateral control is lost and the aircraft falls on to one wing.

According to the invention an aircraft comprises main landing gear components mounted on opposite sides of the longitudinal axis of the aircraft, each component including a piston and cylinder device by operation of which the length of the component can be varied, liquid-actuating means operable reversably by a power source to cause the discharge of liquid from one of the piston and cylinder devices and the supply of liquid to the other device whereby a landing gear component on one side of the aircraft contracts while a landing gear component on the other side extends, and sensing means responsive to the load in each landing gear component, the sensing means controlling the operation of the liquid-actuating means by the power source in accordance with the difference of loads in the two components whereby the more highly loaded component is extended and the lesser loaded component is contracted to change the lateral trim of the aircraft so that the difference between the loads in the components is reduced.

The invention is illustrated in the accompanying drawings, of which:

Figure 1:
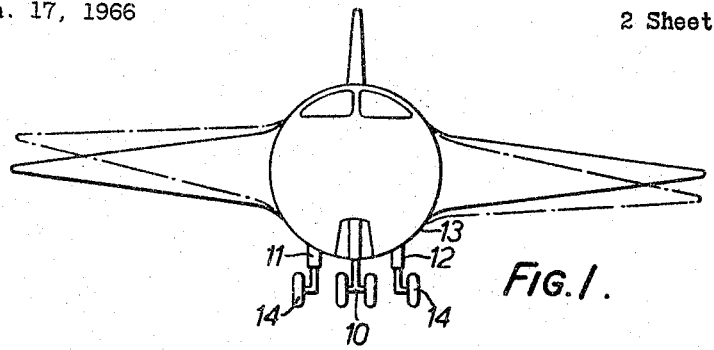
FIGURE 1 is a front elevation of an aircraft having a narrow track main landing gear mounted in the aircraft fuselage.

The aircraft in FIGURE 1 has landing gear comprising a steerable nosewheel component 10, and two main landing components formed as telescopic legs 11, 12 mounted in the aircraft fuselage 13 on opposite sides of the central longitudinal axis of the aircraft. For simplicity in the diagrammatic drawing each leg 11 or 12 is shown with a single wheel 14, though each leg may include more than one wheel or alternatively a multi-wheel bogie. Again, the landing gear may comprise two or more legs mounted on each side of the central axis longitudinally one behind the other.

Figure 2:
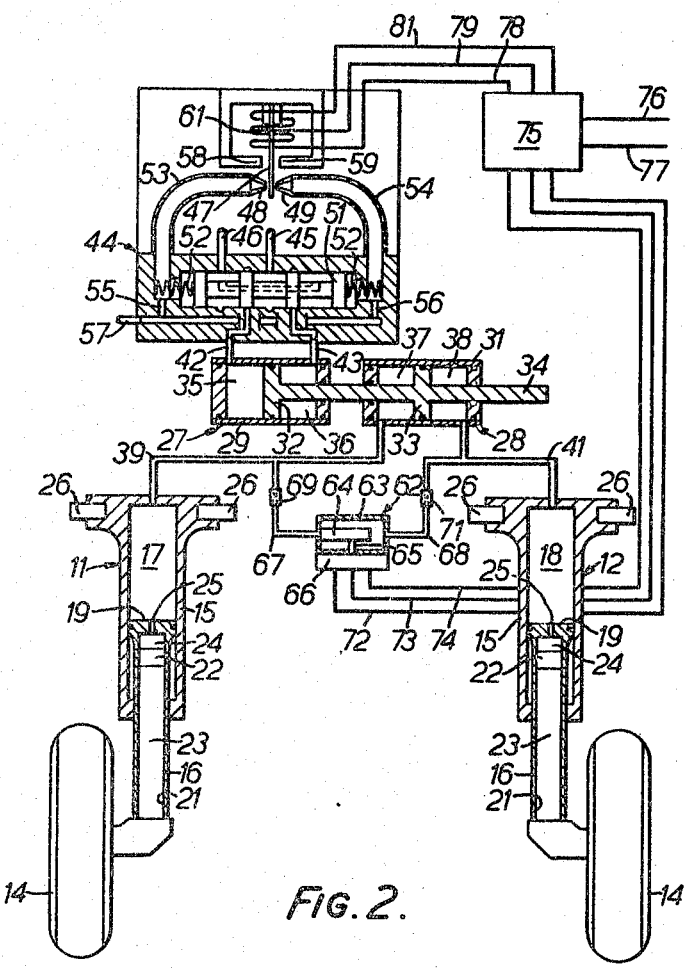
FIGURE 2 is a diagram showing one embodiment of the invention.

One arrangement of devices operable to cause differential extension and contraction of the legs on opposite sides of the central axis for providing laterally stability of the aircraft is shown in FIGURE 2. Each leg 11 or 12 is shown to have telescopic upper and lower elements 15 and 16 defining the variable volume chambers 17 and 18 respectively of fluid shock absorbers. The lower element 16 has a piston head 19 slidable within the bore of the upper element 15. The lower element 16 has a cylindrical bore 21 receiving a piston 22 which separates a compressed gas volume 23 below the piston from a liquid filled volume 24 above. The liquid filled volume 24 communicates with the chamber 17 or 18 through an orifice 25 which, though shown as a simple orifice, may include any of the known valve devices in oleo-pneumatic shock absorbers for controlling liquid flow between the chamber 17 or 18 and the volume 24.

Each upper telescopic element 15 is formed with a head having trunnions 26 by which the leg 11 or 12 is mounted in the aircraft fuselage for pivotal extension and retraction movement.

Fluid power actuating means is provided which includes two piston and cylinder devices, a motor 27 and an actuator 28, having fixed cylinders 29 and 31 respectively and pistons 32 and 33 which are movable in unison by means of a common piston rod 34. The rod 34 extends through one end of the motor cylinder 29 and through both ends of the actuator cylinder 31.

The chambers 37 and 38 on opposite sides of the piston 33 are connected by pipes 39 and 41 to the chambers 17 and 18 respectively. The chambers 35 and 36 on opposite sides of the piston 32 are connected by service pipes 42 and 43 to a control valve 44 which is supplied by the pressure and the return pipes 45 and 46 of an hydraulic power source, not shown, and which is operable to cause displacement of the piston 32 in the cylinder 29.

The control valve 44 is of the kind having an electromagnetically operated flapper 47 working between opposed nozzles 48, 49 of a pilot valve, and a main valve having a spool 51 which is responsive to changes of flow through the nozzles caused by the flapper 47. The spool 51 is centered by springs 52 to close the service pipes 42 and 43 from the hydraulic power source, and the opposite ends of the spool 51 are subject to fluid pressure in passages 53 and 54 which terminate at the nozzles 48, 49. The passages 53 and 54 have fixed flow restrictors 55 and 56 at their inlets supplied by a common fluid pressure source pipe 57. The flapper 47 is provided by an armature which is constructed and arranged for movement between two poles 58 and 59 of a permanent magnet, and which is energised by current flowing in a split winding 61. As the valve 44 is of a known kind it will not be described in further detail.

A pressure transducer 62 is provided, that is to say a sensing device constructed to give an electrical signal of fluid pressure. An elementary form will be described for ease of understanding, consisting of a housing 63 containing a Bourdon tube 64, a shaft 65 by which the movable end of the tube 64 can turn the movable contact of a potentiometer shown generally at 66. The interior of the Bourdon tube 64 is connected by a branch pipe 67 to the pipe 39 and thus to the chamber 17, while the interior of the housing 63 is connected by a branch pipe 68 to the pipe 41 and thus to the chamber 18. Flow restrictors 69 and 71 interposed in the branch pipes 67 and 68 damp the effect of shock loads prevailing in the chambers 17 and 18 and thus serve to transmit substantially the mean or static pressures in these chambers to the Bourdon tube 64 and the housing 63 respectively. The fluid pressures in the chambers 17 and 18 provide signals of load in the legs 11 and 12 respectively.

An electrical signal of fluid pressure difference between the chambers 17 and 18 is transmitted from the potentiometer 66 by three conductors 72, 73, and 74 to a control unit 75. The latter although indicated generally should be understood to include an amplifier supplied by the power conductors 76 and 77, said amplifier having an output fed by the conductors 78, 79 and 81 to the split winding 61 whereby the flapper 47 is actuated in direction and extent substantially in accordance with the fluid pressure differential in the chambers 17, 18.

The sense in which the control valve 44 is arranged to respond to a signal of pressure difference in the chambers 17, 18 is to be understood from the following description of operation. If through one or more causes producing a transverse load on the aircraft, a greater load is borne by the leg 12 then by the leg 11, the leg 11 will extend under expansion of the compressed gas volume 23 in its shock absorber, and the leg 12 will contract under compression of the compressed gas volume 23 in its shock absorber, whereby the wing tip on the same side as the leg 11 rises and the wing tip on the same side as the leg 12 drops, see FIGURE 1. The vertical line through the centre of gravity of the aircraft will shift towards the wheel 14 carried by the leg 12 from its normal position through the mid point between the wheels 14, thus increasing the load borne by the leg 12 still further while correspondingly reducing the load borne by the leg 11. Fluid pressure in the chamber 18 acting through the pipe 41 and upon the Bourdon tube 64 is higher than fluid pressure in the chamber 17 acting through the pipe 39 and within the Bourdon tube 64. The latter causes the potentiometer 66 to send a signal through the conductors 72, 73 and 74 to the control unit 75 which in turn energies one half of the split winding 61 whereby the flapper 47 is urged towards the nozzle 49. The resulting increased fluid pressure in the passage 54 acts on the right hand end of the valve spool 51, causing the latter to connect the pressure pipe 45 to the chamber 35 of the motor 27 and the return pipe 46 to the opposite chamber 36. The motor piston 32 acting under fluid pressure displaces the actuator piston 33 so that liquid is withdrawn from the chamber 17 and forced into the chamber 18. The excess of fluid pressure in the chamber 18 over that in the chamber 17 is therefore increased, and it causes the leg 12 to extend and the leg 11 to contract, thus changing the lateral trim of the aircraft. In consequence, the vertical line through the centre of gravity shifts away from the wheel carried by the leg 12 and towards the wheel carried by the leg 11 so that fluid pressure will fall in the chamber 18 and rise in the chamber 17 whereby the difference between the loads in the legs 11 and 12 is reduced. The leg 12 will continue to extend and the leg 11 to contract until fluid pressures in the chambers 17 and 18 equalize, provided that the transverse load on the aircraft can be balanced before the leg 12 becomes fully extended. Under equal pressures the Bourdon tube centralizes the potentiometer 66 in which condition no current flows in the halves of the split winding 61. The main valve spool 51 is then central and provides a hydraulic lock in the motor 27 thereby preventing liquid flow into or from the chambers 17 and 18.

Figure 3:
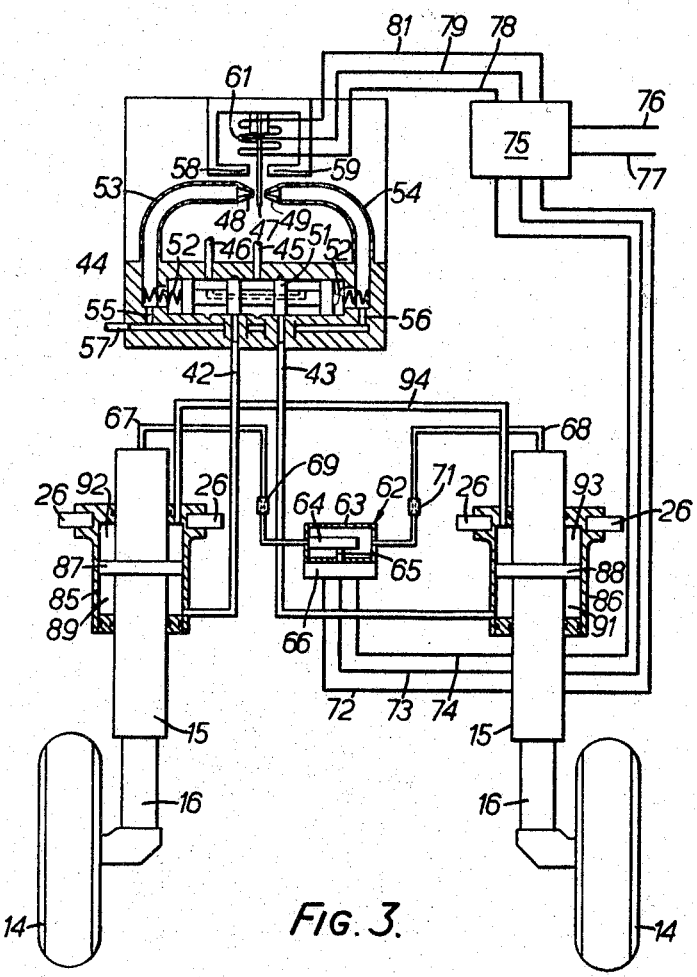
FIGURE 3 is a diagram showing a second embodiment of the invention.

In the example shown in FIGURE 3, the main landing components have telescopic shock absorbing elements 15, 16 as in the previous example. The elements 15 are, however, mounted slidably in left and right hand cylindrical housing 85 and 86, each housing being provided with trunnions 26 by which the landing component is mounted in the aircraft for pivotal extension and retraction movement. The elements 15 constitute piston rods which carry pistons 87 and 88 engaging the bores of the housing 85 and 86 respectively. The elements 85 and 86 thus form piston and cylinder devices by means of which the length of each component in the aircraft can be varied.

The service pipes from the main valve 44 are connected to chambers 89 and 91 below the pistons 87 and 88 respectively, while the chambers 92 and 93 above the pistons are connected one to the other by a pipe 94. The interiors of the left and right hand cylinders 15 are connected by pipes 67 and 68 to the pressure transducer 62, and an electrical signal from the latter acts through a control unit 75 upon a control valve 44 to vary liquid flow in the service pipes 42 and 43, as in the previous example.

If the main valve 44 is operated, for example, to supply liquid under pressure to the pipe 42 and to return liquid from the pipe 43, the piston 87 is urged upwardly in the housing to discharge liquid from the chamber 92 and through the pipe 94 to the chamber 93, while liquid in the chamber 91 is discharged through the pipe 43. The left hand landing gear component contracts and the right hand component extends.

The connection of the service pipes 42 and 43 to the respective lower chambers 89 and 91 of the housings 85 and 86, and the transfer passage between the upper chambers 92 and 93 provided by the pipe 94, enable the piston and cylinder devices 85, 87 and 86, 88 together to form liquid-actuating means which is operable reversably to contract the landing gear component on one side of the aircraft and to extend the landing gear component on the other side.

I claim as my invention:

1. An aircraft comprising at least one pair of main landing gear components of which one component is mounted on one side and the other component is mounted on the other side of the longitudinal axis of the aircraft, each component including a piston and cylinder device defining a liquid-receiving chamber which is arranged upon an increase in its volume to extend the component and upon a decrease in its volume to contract the component, liquid-actuating means associated with each liquid-receiving chamber, said means being operable reversably by a power source to cause the discharge of liquid from one of said chambers and the supply of liquid to the other of said chambers, control means interposed between the power source and the liquid-actuating means, the control means being operable to cause operation of the liquid-actuating means in one sense or in the reverse sense, and sensing means responsive to the difference of loads sustained by the landing gear components on opposite sides of the longitudinal axis of the aircraft, the load-sensing means being operable on the control means to control the liquid-actuating means whereby liquid is supplied to the liquid-receiving chamber of the more highly loaded component and discharged from the liquid-receiving chamber of the lesser loaded component with effect to change the lateral trim of the aircraft so that the difference between the loads in the components is reduced.

2. An aircraft according to claim 1, wherein the load-sensing means includes means responsive to the pressure of liquid in each piston and cylinder device, each of said pressures providing a measure of the load sustained by the respective landing gear component.

3. An aircraft according to claim 2, wherein the pressure responsive means comprises a member which is acted upon differentially by the liquid pressures in both of the piston and cylinder devices.

4. An aircraft according to claim 3, wherein the load-sensing means includes a transducer arranged to produce an electrical signal of the liquid pressure difference, wherein the control means includes an electrically-operated valve controlled by said electrical signal, and wherein the liquid-actuating means includes a hydraulic motor controlled by said valve.

5. An aircraft according to claim 1, wherein each piston and cylinder device is an oleo-pneumatic shock absorber containing the liquid-receiving chamber, and wherein the liquid-actuating means includes a motor drivable by the power source, and a liquid actuator which is mechanically connected to the motor, said liquid actuator having liquid connections to both of said chambers and being arranged, in operation, to deliver liquid through one of said connections and to receive liquid through the other connection.

6. An aircraft according to claim 5, wherein the motor ad the liquid actuator both comprise double-acting piston and cylinder mechanisms having mechanically connected pistons, the motor being operable by the power source which provides fluid power.

7. An aircraft according to claim 1, wherein each piston and cylinder device comprises a cylindrical housing forming a fixed part of the landing gear component, and a piston member forming the extensible and contractable part of said component, each piston member separating an upper chamber in said housing which forms the liquid-receiving chamber, from a lower chamber which forms a part of said liquid-actuating means, said liquid-actuating means also including liquid connections between each lower chamber and the power source which provides fluid power through the control means, and a liquid transfer passage interconnecting both liquid-receiving chambers.

References Cited

FOREIGN PATENTS 912,549  12/1962  Great Britain.

MILTON BUCHLER, *Primary Examiner.*

P. E. SAUBERER, *Assistant Examiner.*